US012680569B2

(12) United States Patent
Huang

(10) Patent No.: US 12,680,569 B2
(45) Date of Patent: Jul. 14, 2026

(54) FASTENING DEVICE

(71) Applicant: Wen-Pin Huang, Kaohsiung (TW)

(72) Inventor: Wen-Pin Huang, Kaohsiung (TW)

( * ) Notice: Subject to any disclaimer, the term of this patent is extended or adjusted under 35 U.S.C. 154(b) by 454 days.

(21) Appl. No.: 18/241,117

(22) Filed: Aug. 31, 2023

(65) Prior Publication Data

US 2024/0011521 A1 Jan. 11, 2024

(51) Int. Cl.
| *F16B 39/36* | (2006.01) |
| *F16B 25/00* | (2006.01) |
| *F16B 35/04* | (2006.01) |
| *F16B 39/10* | (2006.01) |

(52) U.S. Cl.
CPC .......... *F16B 39/10* (2013.01); *F16B 25/0057* (2013.01); *F16B 35/048* (2013.01); *F16B 39/36* (2013.01)

(58) Field of Classification Search
CPC .... F16B 25/0057; F16B 25/045; F16B 39/36; F16B 5/0275; F16B 35/048
USPC ................................ 411/413, 277, 278, 280
See application file for complete search history.

(56) References Cited

U.S. PATENT DOCUMENTS

| 701,530 | A | * | 6/1902 | Alger | ...................... | F16B 39/36 |
| | | | | | | 411/935 |
| 2,024,069 | A | * | 12/1935 | Sharp | ...................... | F16B 4/004 |
| | | | | | | 411/425 |

| 2,290,270 | A | * | 7/1942 | Brackett | ............... | F16B 39/286 |
| | | | | | | 411/937.1 |
| 3,124,031 | A | * | 3/1964 | Knohl | ................... | F16B 5/0275 |
| | | | | | | 411/932 |
| 3,418,013 | A | * | 12/1968 | Kelly | .................... | F16B 35/048 |
| | | | | | | 403/22 |
| 4,893,977 | A | * | 1/1990 | Tramezzani | ............ | F16B 39/36 |
| | | | | | | 411/222 |
| 6,125,526 | A | * | 10/2000 | Wierzchon | ............ | F16B 5/0275 |
| | | | | | | 411/335 |
| 12,152,622 | B2 | * | 11/2024 | Carlos | ................. | F16B 25/0031 |
| 2009/0003969 | A1 | * | 1/2009 | Gattone | .................. | F16B 35/06 |
| | | | | | | 411/413 |

* cited by examiner

*Primary Examiner* — Flemming Saether

(57) ABSTRACT

A fastening device includes a reverse self-tapping screw including a nut and a threaded shank having a tapered section and a threaded section wherein the tapered section is a reverse self-tapping screw formed on the threaded shank adjacent to the nut and has a length of d/4 to d/3; the reverse self-tapping screw is a screw having a tapered surface of 1.5×d/16; and the threaded section is a forward threaded screw; and an anti-loosening assembly including an internally threaded fastening element and a retaining ring. The internally threaded fastening element includes a nut member and an anti-loosening member having a plurality of spiral constriction grooves. The spiral constriction grooves have an inclined angle of 30°-60° with respect to an axis thereof, and an annular groove for securely receiving the retaining ring.

3 Claims, 12 Drawing Sheets

1

112

11

111

10

101

100

100

10

101

1010

1011 d/4-d/3 d 1.5 x d/16

101

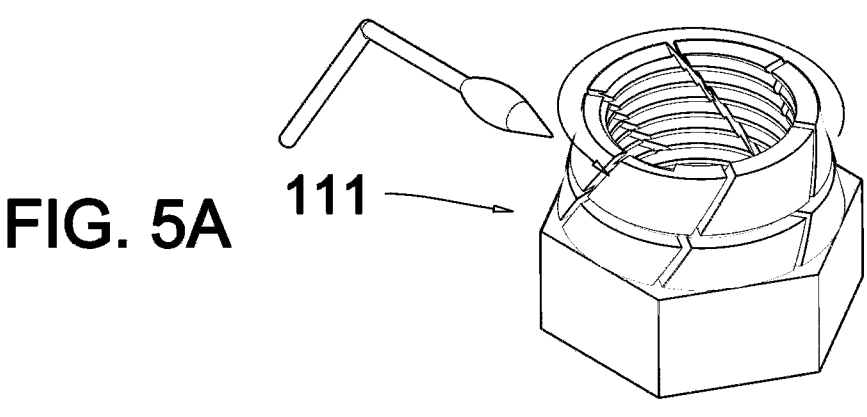
FIG. 5A          111
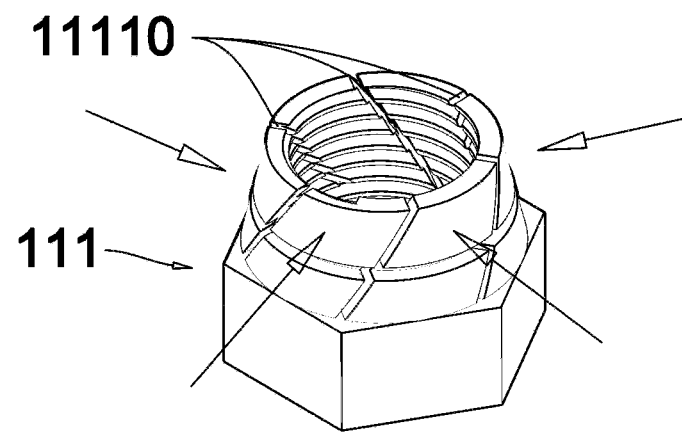
11110
FIG. 5B          111
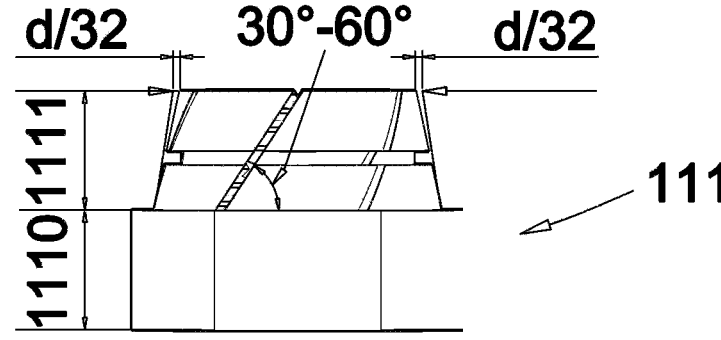
d/32          30°-60°          d/32
FIG. 5C          111
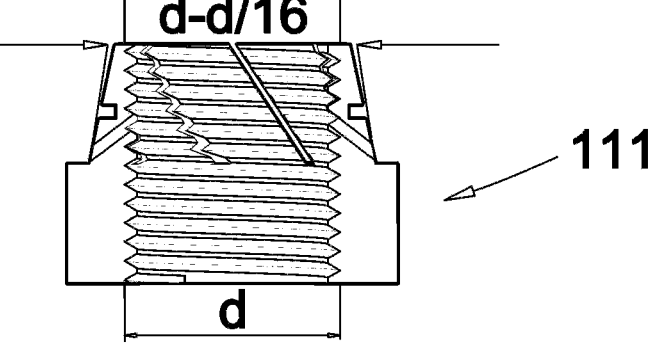
d-d/16
FIG. 5D          111
d

2

2 d+d/16

2

101

1010

1011

111

2

111

10

FASTENING DEVICE

BACKGROUND OF THE INVENTION

1. Field of the Invention

The invention relates to anti-loosening assemblies and more particularly to a fastening device comprising a reverse self-tapping screw and an anti-loosening assembly having improved characteristics.

2. Description of Related Art

Typically, a work piece fastened by a screw or bolt and nut combination will not become loose in a static state. However, the work piece may loosen if the work piece is in a vibrational environment for a long time because the vibration may be transferred to the screw or bolt and nut combination and loosen the screw or bolt and nut combination.

Thus, the need for improvement still exists.

SUMMARY OF THE INVENTION

It is therefore one object of the invention to provide a fastening device comprising a reverse self-tapping screw including a nut and a threaded shank having a tapered section and a threaded section wherein the tapered section is a reverse self-tapping screw formed on the threaded shank adjacent to the nut and has a length of d/4 to d/3; the reverse self-tapping screw is a screw having a tapered surface of 1.5×d/16; and the threaded section is a forward threaded screw; and an anti-loosening assembly including an internally threaded fastening element and a retaining ring; wherein the internally threaded fastening element includes a nut member and an anti-loosening member having a plurality of spiral constriction grooves; and wherein the spiral constriction grooves have an inclined angle of 30°-60° with respect to an axis thereof, and an annular groove for securely receiving the retaining ring.

The invention has the following advantages and benefits in comparison with the conventional art:

The final assembling step can be performed from either end. The fastening element is rotated through the tapered section of the threaded shank to secure the reverse self-tapping screw to the work pieces. The final assembling step can be performed from either end. Thus, the assembly is made easy. To the contrary, in the conventional art a worker has to perform on two ends of a threaded fastener in the fastening step.

The fastening of the anti-loosening assembly can be performed from either end. The anti-loosening assembly can be performed from either end to fasten the reverse self-tapping screw and the work pieces together. Thus, the assembly is made easy. To the contrary, in the conventional art a worker has to perform on two ends of a threaded fastener in the fastening step.

The purpose of anti-loosening can be obtained. The anti-loosening member of the fastening element is subjected to a heat treatment method in which the constriction grooves are constricted by forging and the extent of the constriction is d/32. The anti-loosening member has a diameter of d–d/16 so that the fastening element and the reverse self-tapping screw can be fitted together. The anti-loosening member includes the plurality of spiral constriction grooves having an inclined angle of 30°-60° with respect to an axis thereof, and the annular groove in the constriction groove for securely receiving the retaining ring.

The above and other objects, features and advantages of the invention will become apparent from the following detailed description taken with the accompanying drawings.

BRIEF DESCRIPTION OF THE DRAWINGS

FIGS. 5A and 5B schematically show steps of the fastening element being subjected to a heat treatment method respectively;

FIG. 5C is a side elevation of the fastening element in FIG. 5B;

FIG. 5D is a longitudinal sectional view of internal threads of the fastening element in FIG. 5B;

DETAILED DESCRIPTION OF THE INVENTION

Figure 1:
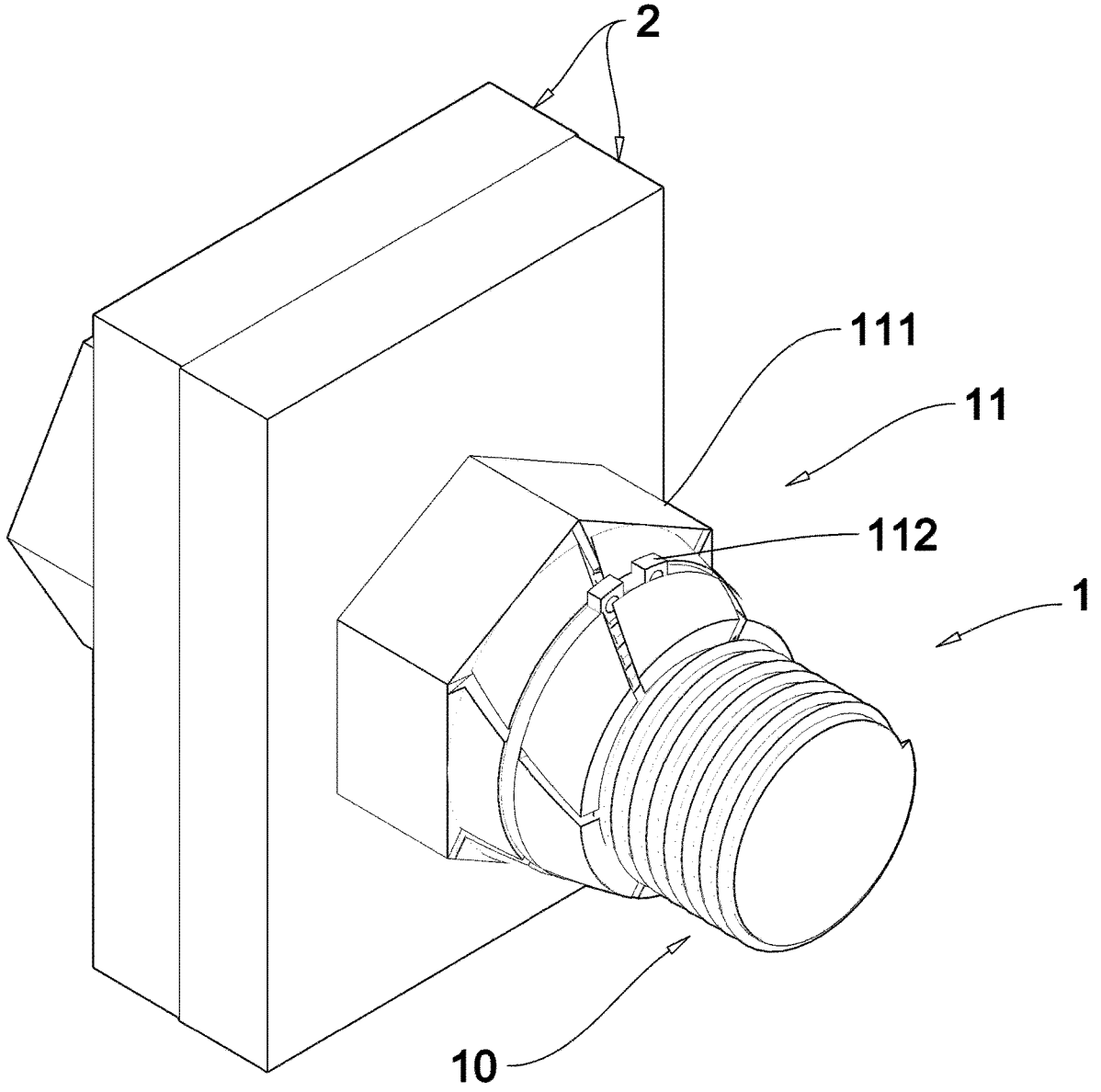
FIG. 1 is a perspective view of two work pieces secured by a fastening device according to the invention.
Figure 2:
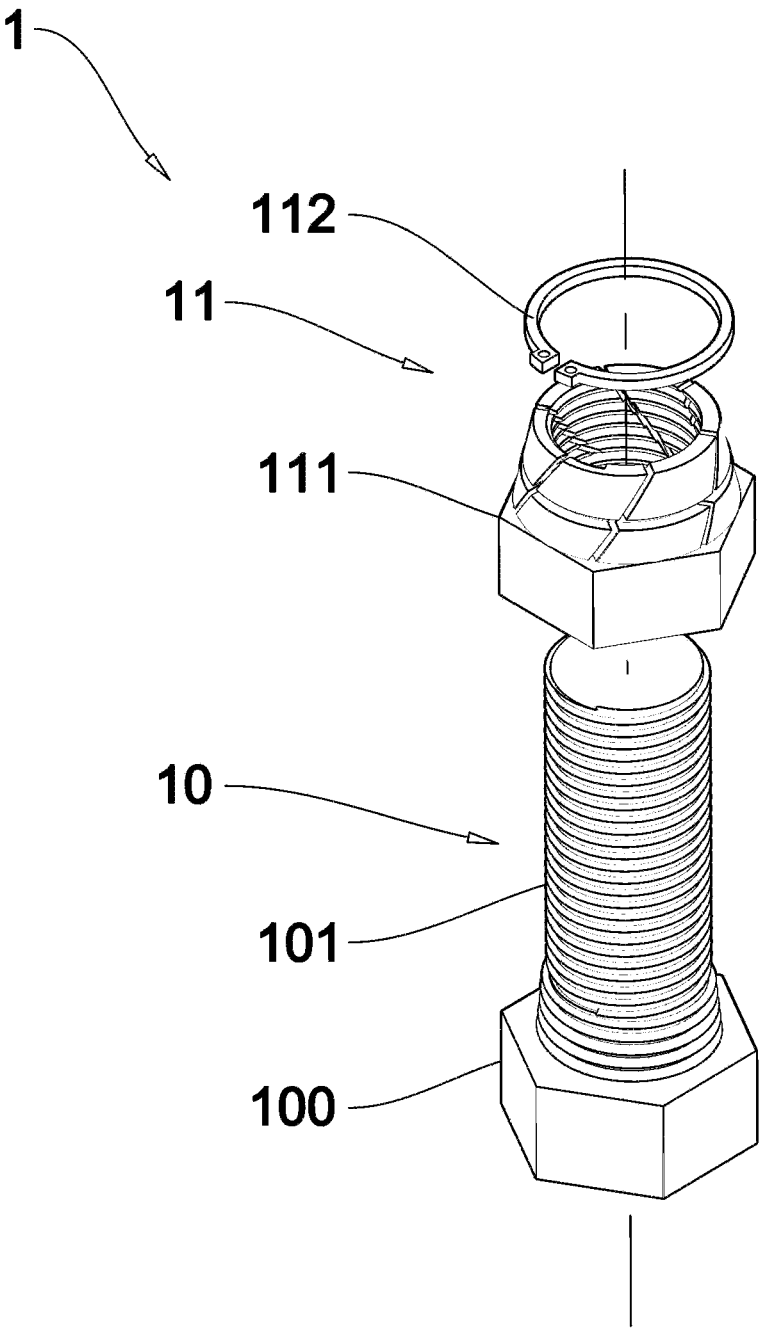
FIG. 2 is an exploded view of the fastening device.
Figure 3A:
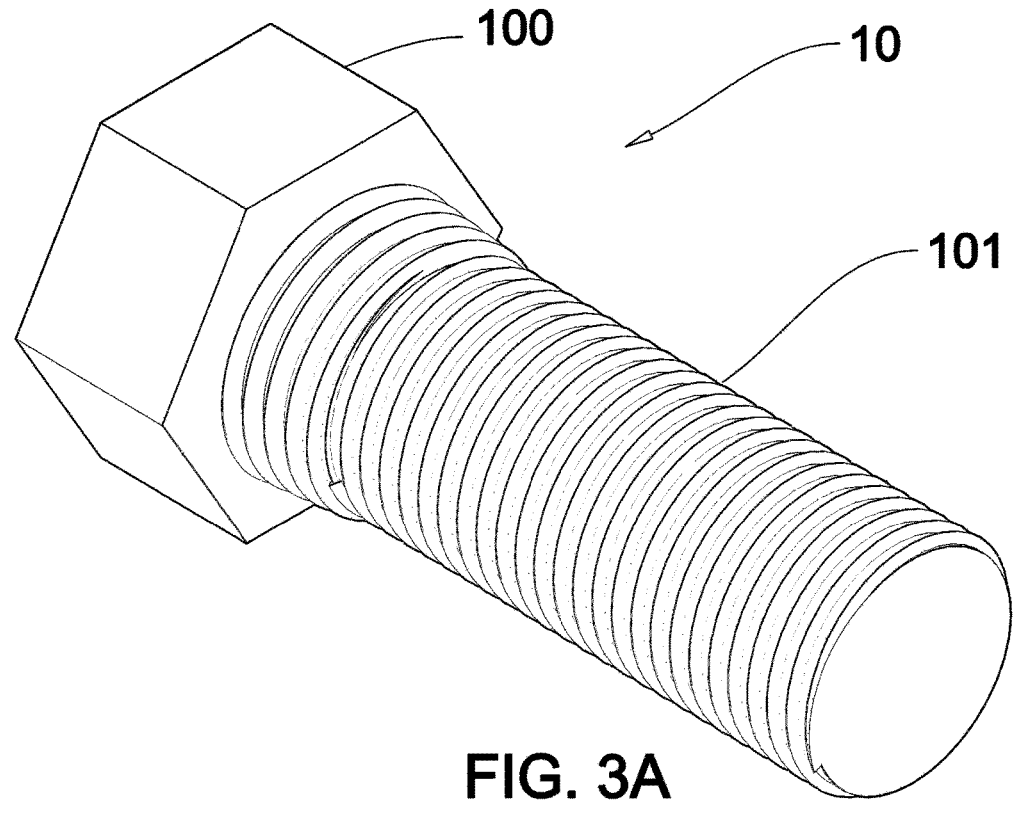
FIG. 3A is a perspective view of the reverse self-tapping screw.
Figure 3B:
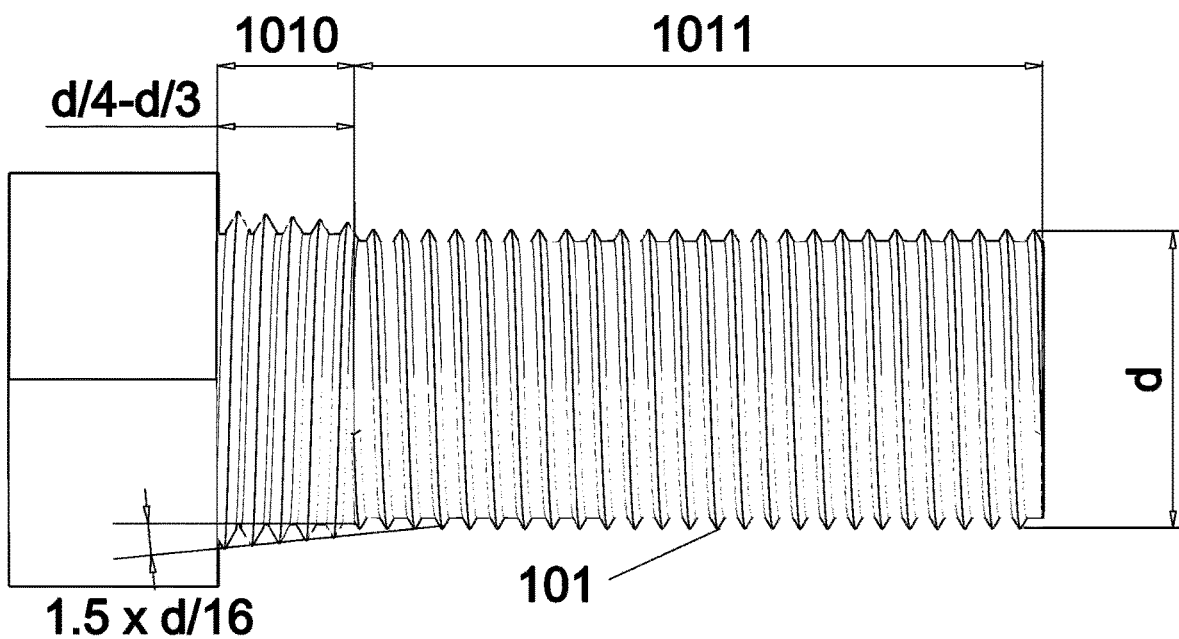
FIG. 3B is a side elevation of the reverse self-tapping screw.
Figure 4:
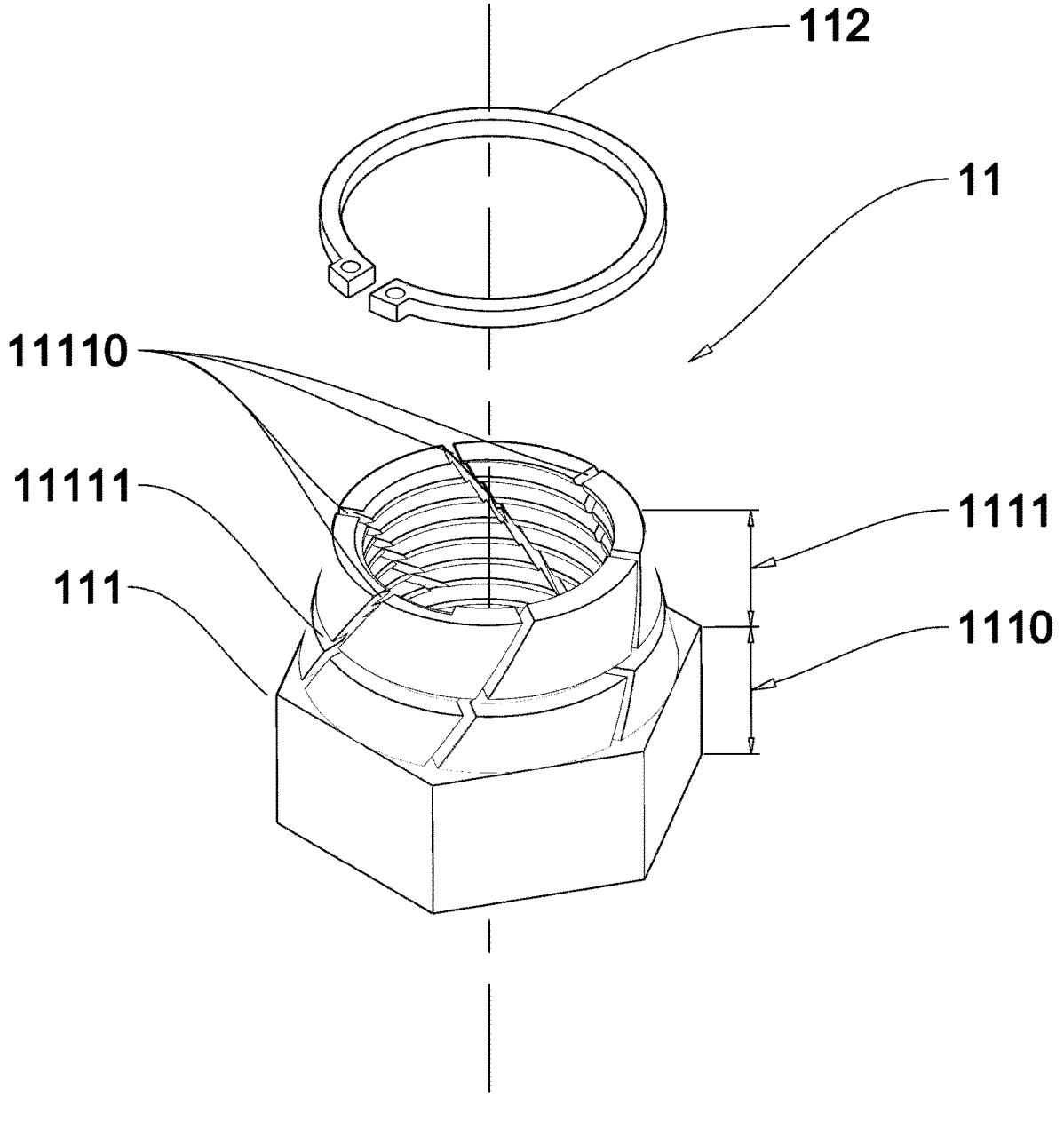
FIG. 4 is an exploded view of the anti-loosening assembly.

Referring FIGS. 1 to 4, a fastening device 1 in accordance with the invention comprises a reverse self-tapping screw 10 and an anti-loosening assembly 11 as detailed below.

The reverse self-tapping screw 10 includes a head 100 and a threaded shank 101 having a tapered section 1010 implemented as a reverse self-tapping screw formed on the threaded shank 101 adjacent to the head 100; and a threaded section 1011 implemented as a forward threaded screw. The tapered section 1010 has a length of d/4 to d/3, where d is a diameter of the threaded shank 101. The threaded section 1011 is provided on the threaded shank 101. The anti-loosening assembly 11 includes a fastening element 111 and a retaining ring 112. The fastening element 111 includes an internally threaded hole (not numbered) secured to the threaded shank 101, a nut member 1110, and an anti-loosening member 1111 having a plurality of spiral constriction grooves 11110 having an inclined angle of 30°-60° with respect to an axis thereof, and an annular groove 11111 in the constriction groove 11110 for securely receiving the retaining ring 112.

The tapered section 1010 of the threaded shank 101 is hardened by means of high frequency heat treatment so as to be applicable to many different applications.

Referring to FIG. 5 in conjunction with FIGS. 1 to 4, heat treatment of the fastening device 1 of the invention is detailed below. The anti-loosening member 1111 of the fastening element 111 is subjected to a heat treatment method in which the constriction grooves 11110 are constricted by forging and the extent of the constriction is d/32. The anti-loosening member 1111 has a diameter of d–d/16.

Figure 6:
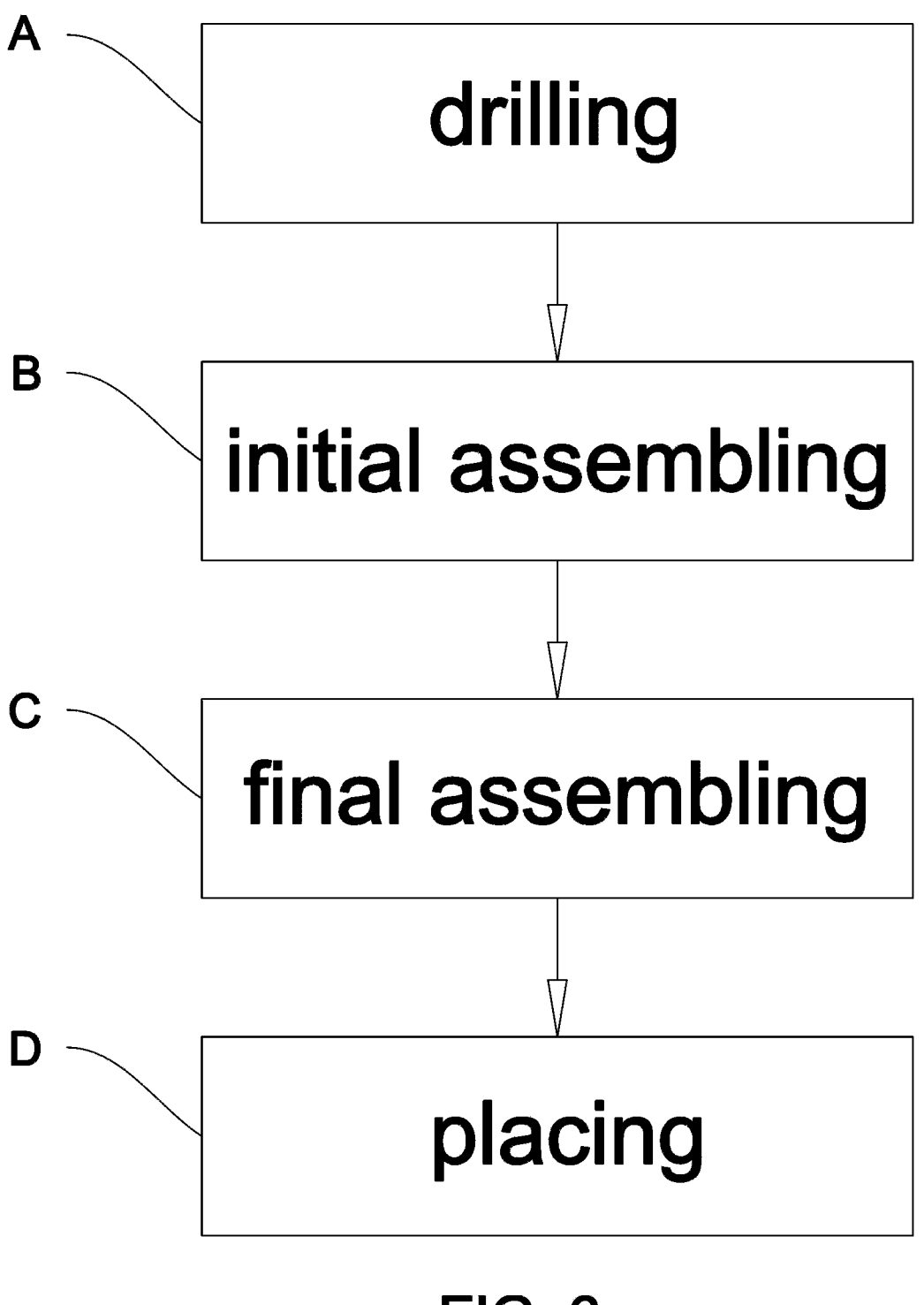
FIG. 6 is a flow chart illustrating an installation of the fastening device according to the invention.

Referring to FIG. 6 in conjunction with FIG. 1, an installation of the fastening device 1 is illustrated below.

Figures 7A, 7B:
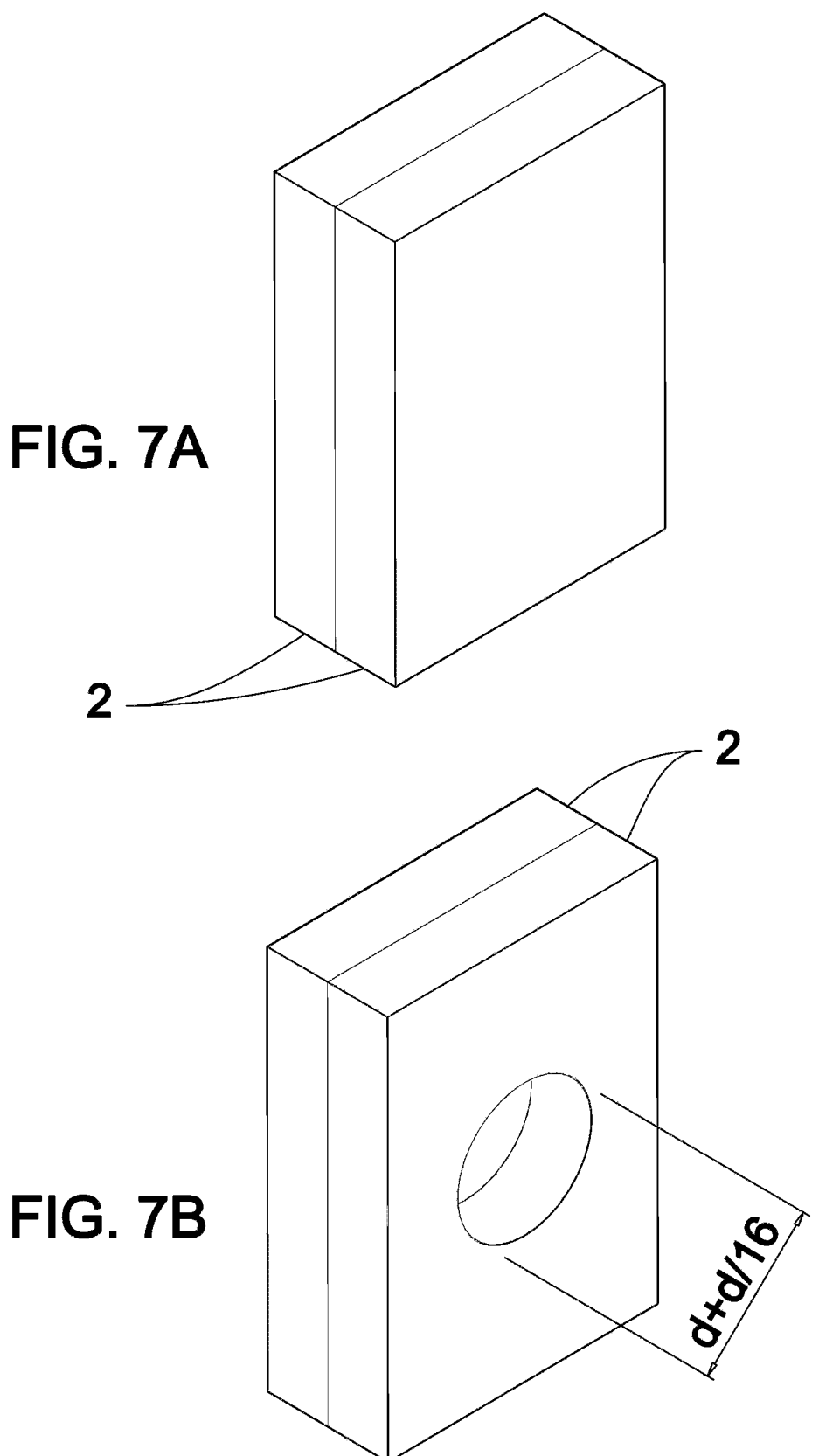
FIG. 7A is a perspective view of the work pieces.
FIG. 7B is a perspective view of the work pieces having a hole formed by the drilling step in FIG. 6.
Figure 8:
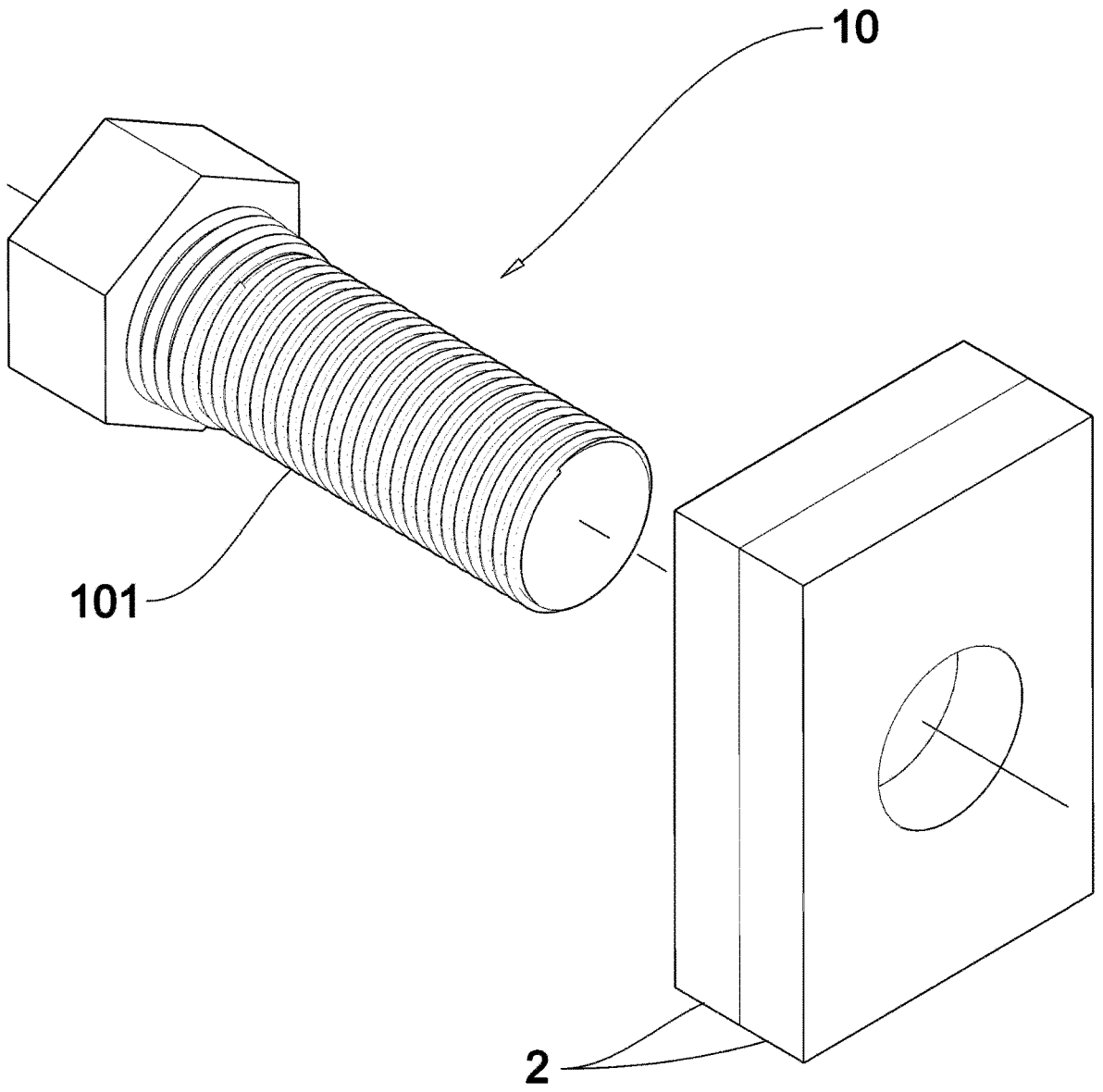
FIG. 8 schematically depicts the reverse self-tapping screw being prepared to insert through the work pieces.
Figure 9A:
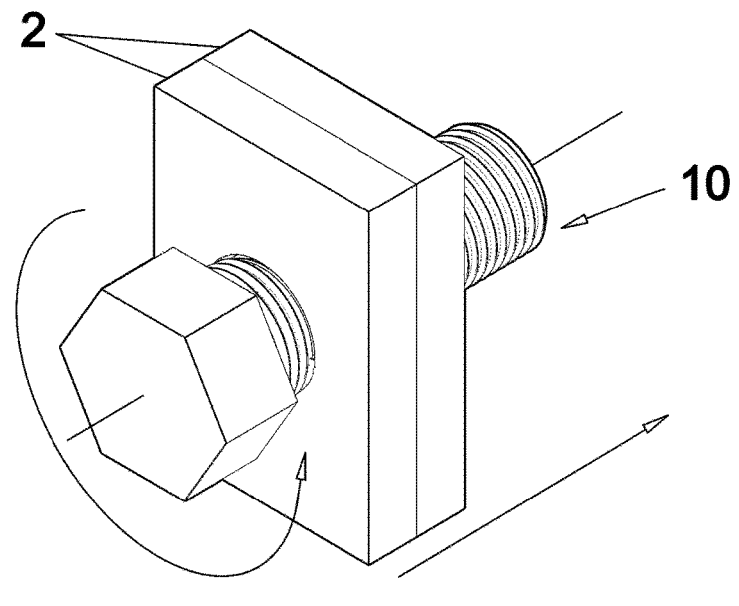
FIG. 9A schematically depicts the reverse self-tapping screw being inserted through the work pieces by rotating.
Figure 9B:
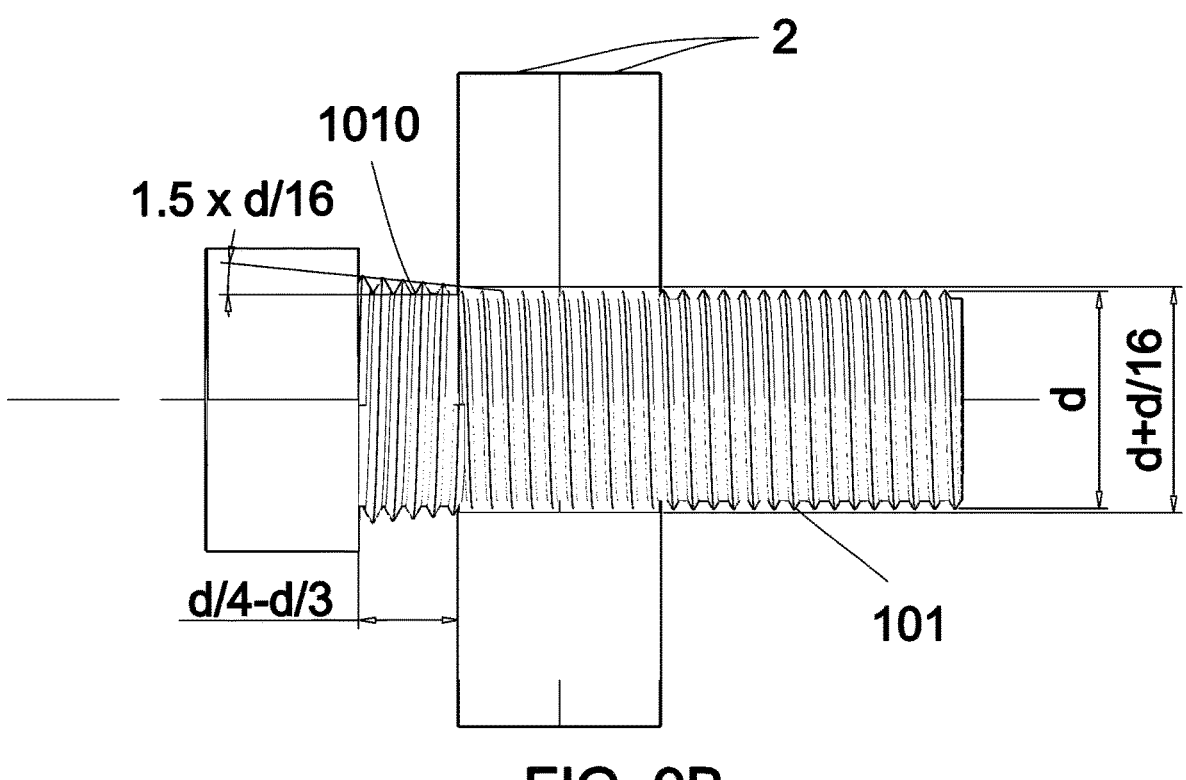
FIG. 9B is a side elevation of FIG. 9A.
Figure 10A:
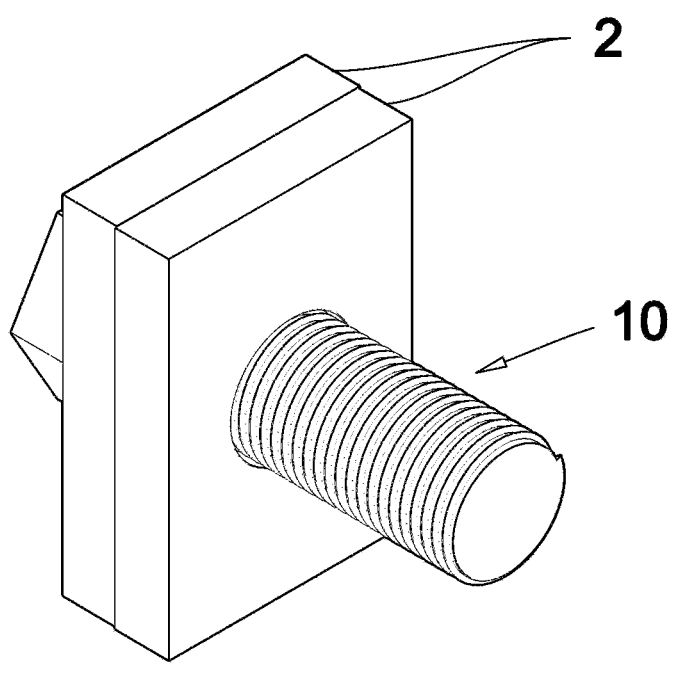
FIG. 10A schematically depicts the reverse self-tapping screw having been inserted through the work pieces.
Figure 10B:
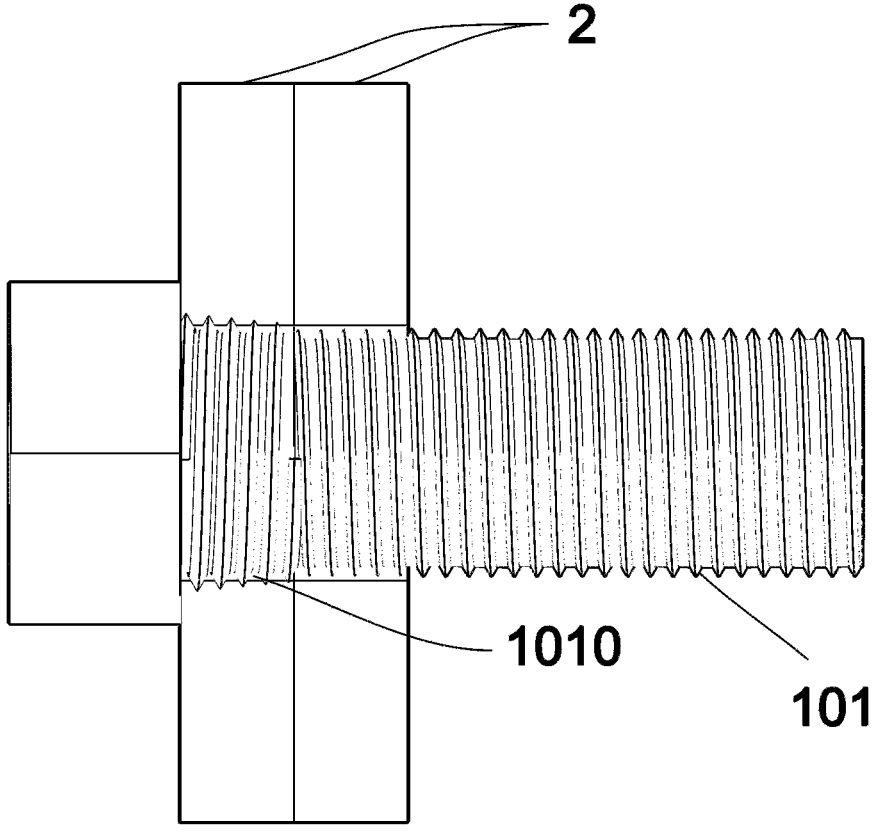
FIG. 10B is a side elevation of FIG. 10A.

Referring to FIGS. 6, 7A and 7B in conjunction with FIGS. 1 to 4, in a drilling step A, a hole having a diameter of d+d/16 slightly greater than a diameter of the threaded shank 101 is drilled through each of two work pieces 2.

Referring to FIGS. 6, 8, 9A, 9B, 10A and 10B in conjunction with FIGS. 1 to 4, in an initial assembling step B, the reverse self-tapping screw 10 is inserted into the holes of the work pieces 2, and the tapered section 1010 of the threaded shank 101 is rotated through the work pieces 2. As a result, the reverse self-tapping screw 10 is secured to the work pieces 2.

Figure 11A:
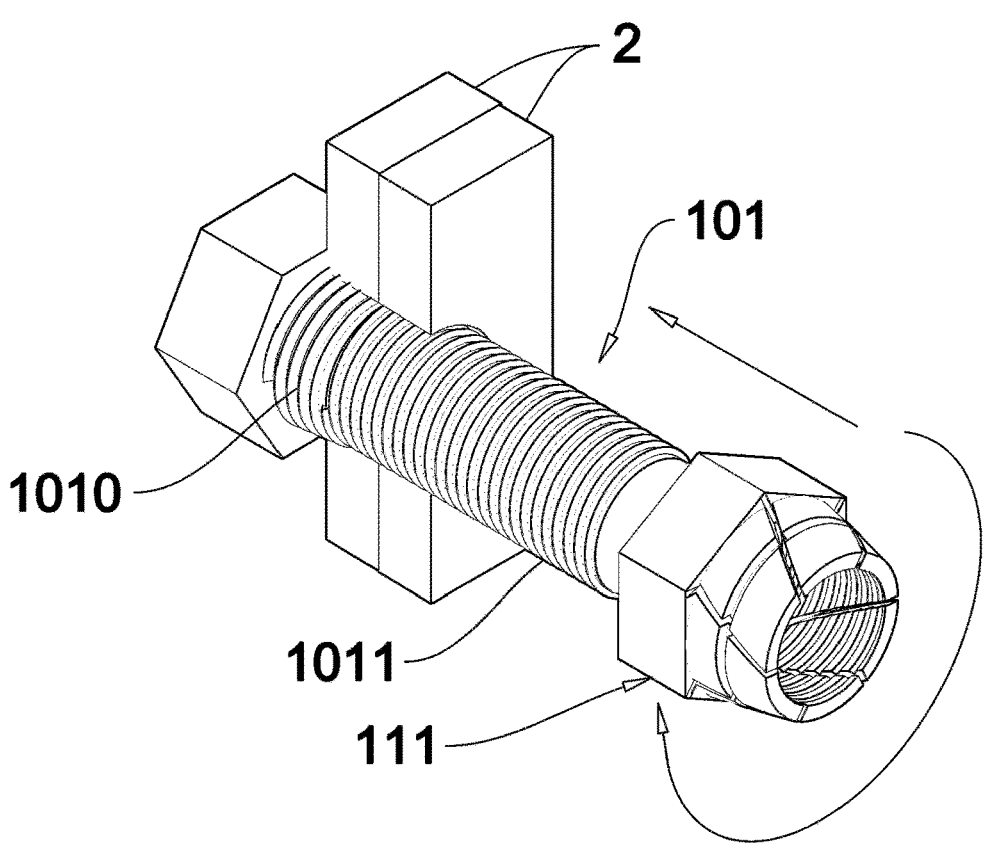
FIG. 11A schematically depicts the fastening element being about to rotate through the tapered section of the threaded shank to secure to the work pieces.
Figure 11B:
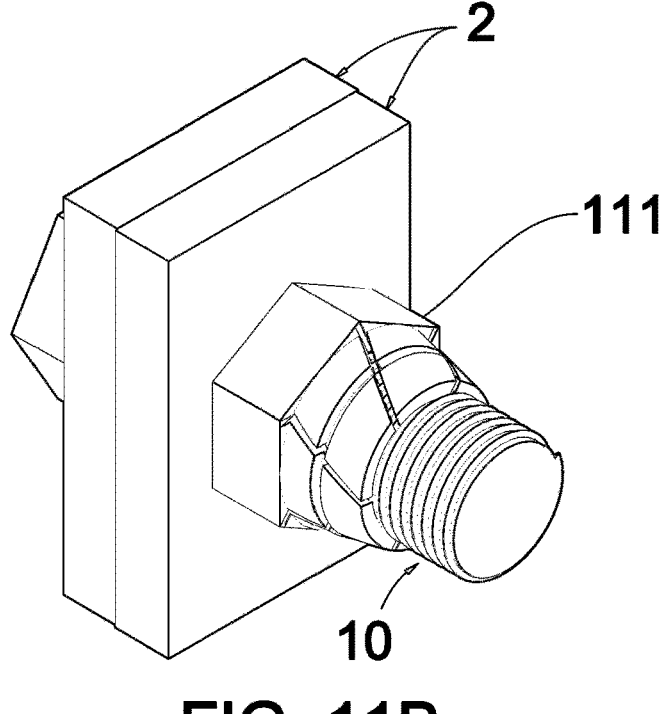
FIG. 11B is a perspective view of the fastening element secured to the work pieces at an end of the fastening step in FIG. 11A.

Referring to FIGS. 6, 11A, and 11B in conjunction with FIGS. 1 to 4, in a final assembling step C, the fastening element 111 is rotated through the threaded section 1011 of the threaded shank 101 to secure to the work pieces 2. The final assembling step C can be performed from either end. The tapered section 1010 of the threaded shank 101 exerts an opposite force on the work pieces 2 for bringing about the fastening effect.

Figure 12A:
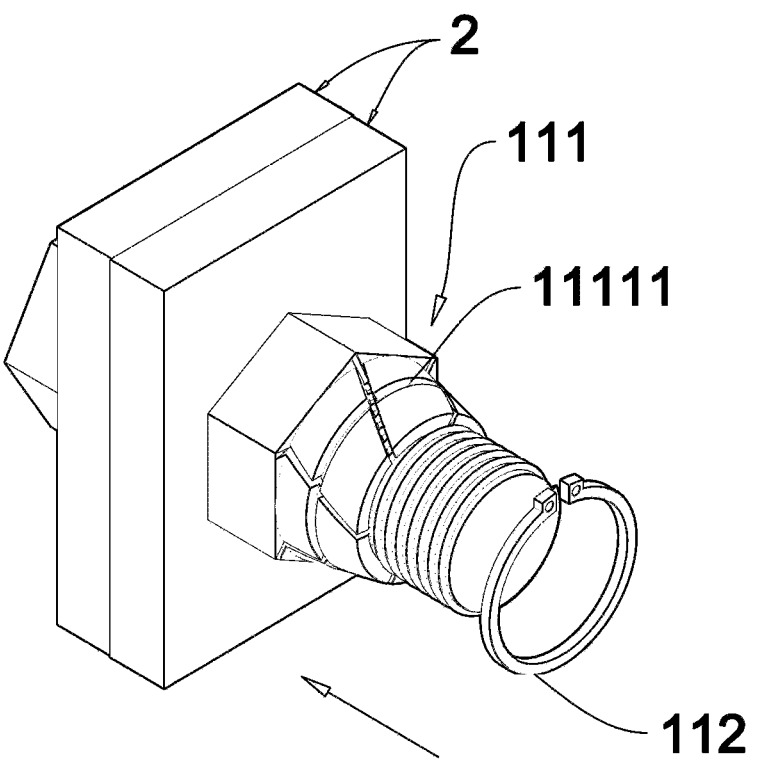
FIG. 12A schematically depicts the retaining ring being about to place in the annular groove of the fastening element in the placing step.
Figure 12B:
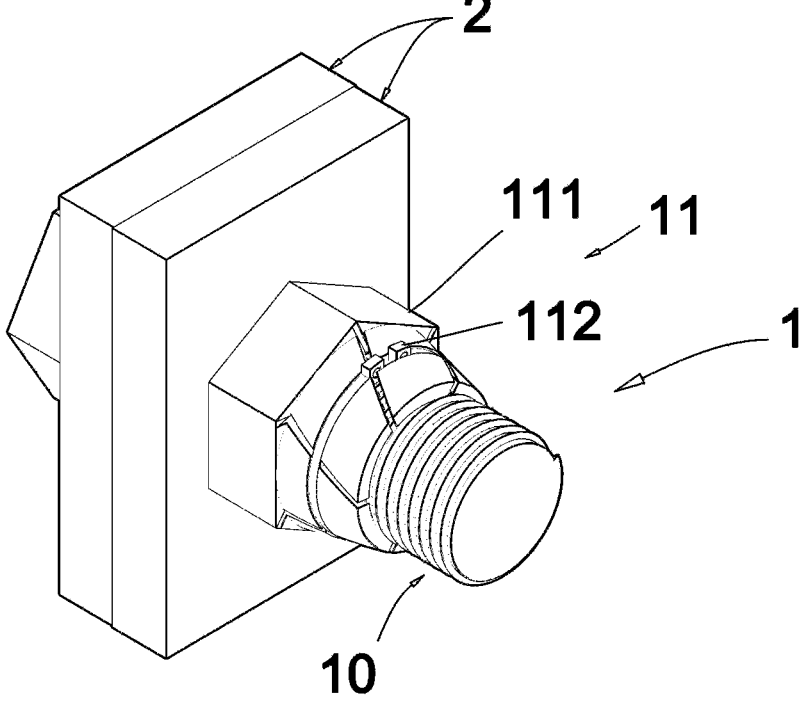
FIG. 12B is a perspective view of the retaining ring placed in the annular groove of the fastening element at an end of the placing step.

Referring to FIGS. 6, 12A, and 12B in conjunction with FIGS. 1 to 4, in a placing step D, the retaining ring 112 is placed in the annular groove 11111 of the fastening element 111. As an end, the work pieces 2 are fastened together by the fastening device 1.

In view of the above, the anti-loosening assembly 11 includes a fastening element 111 and a retaining ring 112. The fastening element 111 includes an internally threaded hole (not numbered) secured to the threaded shank 101, a nut member 1110, and an anti-loosening member 1111 having a plurality of spiral constriction grooves 11110 having an inclined angle of 30°-60° with respect to an axis thereof, and an annular groove 11111 in the constriction groove 11110 for securely receiving the retaining ring 112. The anti-loosening member 1111 is subjected to annealing. The constriction grooves 11110 are formed by annealing and the extent of the constriction is d/32. The anti-loosening member 1111 has a diameter of d–d/16 so that the fastening element 111 and the reverse self-tapping screw 10 can be fitted together.

The invention has the following advantages and benefits in comparison with the conventional art:

The final assembling step C can be performed from either end. The fastening element 111 is rotated through the tapered section 1010 of the threaded shank 101 to secure the reverse self-tapping screw 10 to the work pieces 2. The final assembling step C can be performed from either end. Thus, the assembly is made easy. To the contrary, in the conventional art a worker has to perform on two ends of a threaded fastener in the fastening step.

The fastening of the anti-loosening assembly 11 can be performed from either end. The anti-loosening assembly 11 can be performed from either end to fasten the reverse self-tapping screw 10 and the work pieces 2 together. Thus, the assembly is made easy. To the contrary, in the conventional art a worker has to perform on two ends of a threaded fastener in the fastening step.

The purpose of anti-loosening can be obtained. The anti-loosening member of the fastening element is subjected to a heat treatment method in which the constriction grooves are constricted by forging and the extent of the constriction is d/32. The anti-loosening member 1111 has a diameter of d–d/16 so that the fastening element 111 and the reverse self-tapping screw 10 can be fitted together. The anti-loosening member 1111 includes the plurality of spiral constriction grooves 11110 having an inclined angle of 30°-60° with respect to an axis thereof, and the annular groove 11111 in the constriction groove 11110 for securely receiving the retaining ring 112.

While the invention has been described in terms of preferred embodiments, those skilled in the art will recognize that the invention can be practiced with modifications within the spirit and scope of the appended claims.

What is claimed is:

1. A fastening device, comprising:
   a reverse self-tapping screw including a head and a threaded shank having a tapered section and a threaded section wherein the tapered section is a reverse self-tapping screw formed on the threaded shank adjacent to the head and has a length of d/4 to d/3, where d is a diameter of the threaded shank; and the threaded section is a forward threaded screw; and
   an anti-loosening assembly including an internally threaded fastening element and a retaining ring;
   wherein the internally threaded fastening element includes a nut member and an anti-loosening member having a plurality of spiral constriction grooves; and
   wherein the spiral constriction grooves have an inclined angle of 30°-60° with respect to an axis thereof, and an annular groove for securely receiving the retaining ring.

2. The fastening device of claim 1, wherein the tapered section of the threaded shank is hardened by means of high frequency heat treatment.

3. The fastening device of claim 1, wherein the anti-loosening member is subjected to a heat treatment method, wherein the constriction grooves are constricted by forging and the extent of the constriction is d/32, and wherein the anti-loosening member has a diameter of d–d/16.

* * * * *